UNITED STATES PATENT OFFICE.

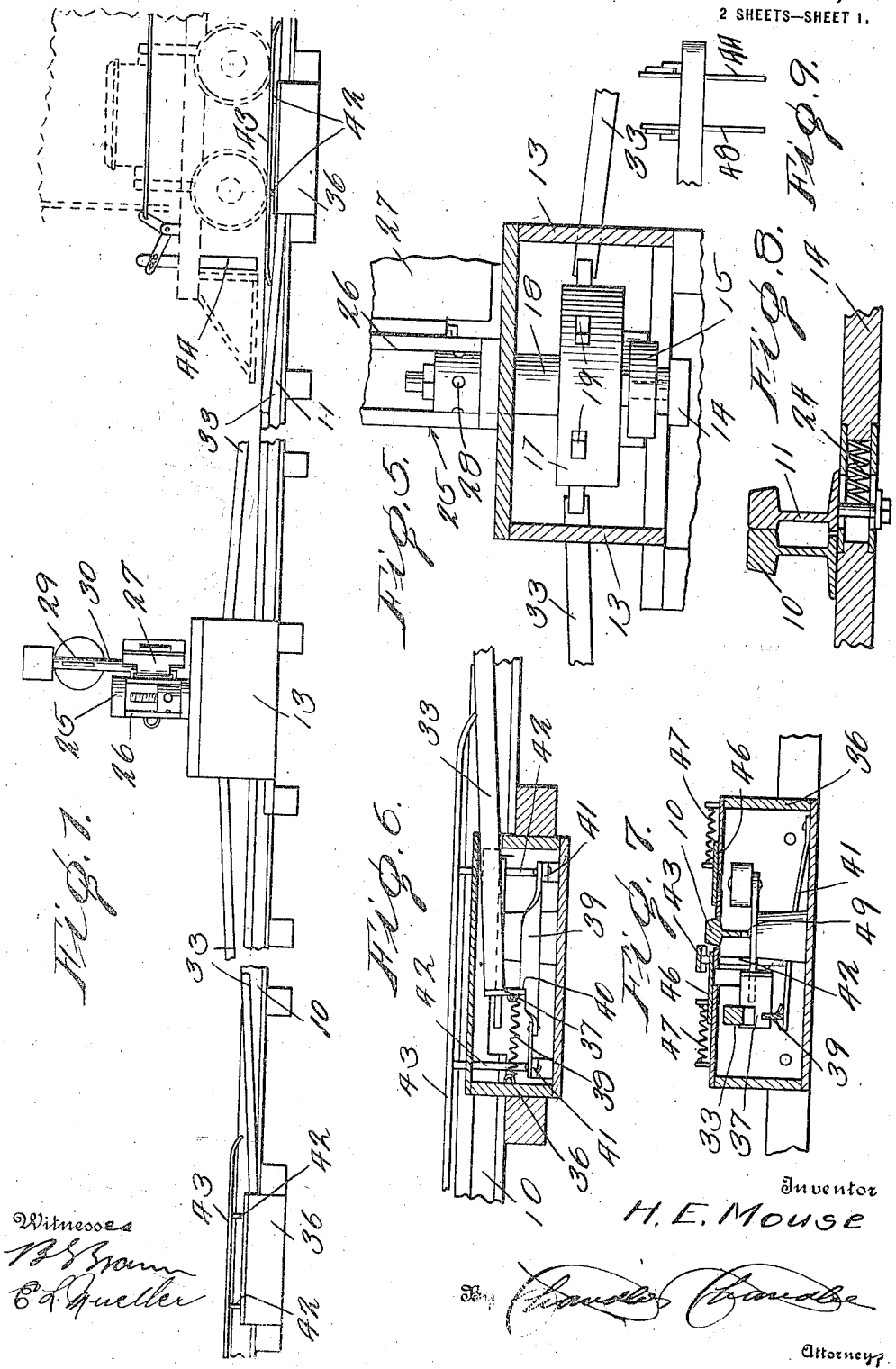

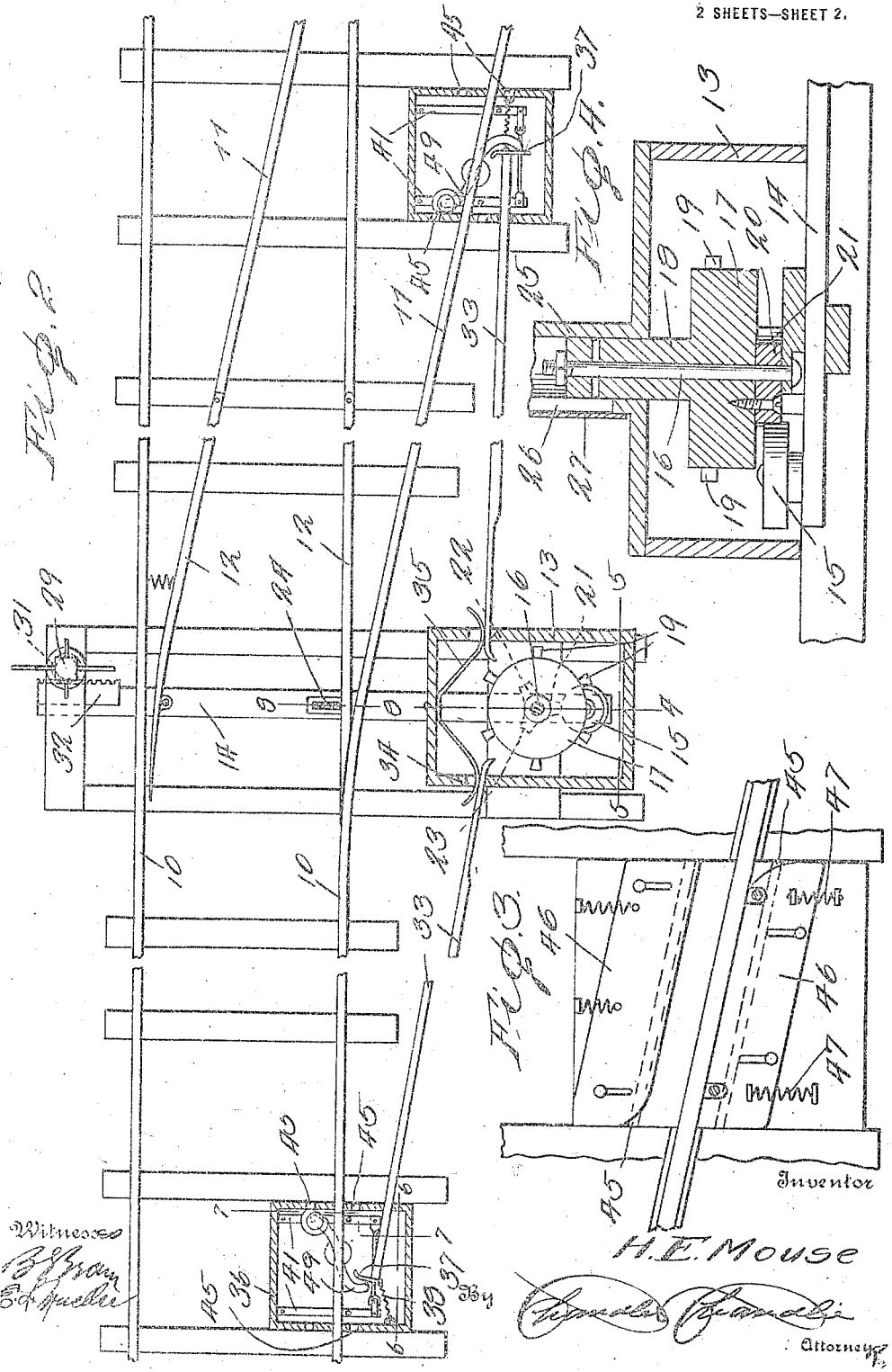

HAROLD E. MOUSE, OF ELKINS, WEST VIRGINIA.

SWITCH-OPERATING MECHANISM.

1,254,341.  Specification of Letters Patent.  Patented Jan. 22, 1918.

Application filed April 23, 1917. Serial No. 163,955.

*To all whom it may concern:*

Be it known that I, HAROLD E. MOUSE, a citizen of the United States, residing at Elkins, in the county of Randolph, State of West Virginia, have invented certain new and useful Improvements in Switch-Operating Mechanism; and I do hereby declare the following to be a full, clear, and exact description of the invention, such as will enable others skilled in the art to which it appertains to make and use the same.

This invention is an improvement in railway appliances and has particular reference to a train operated switch mechanism.

Briefly stated, the invention includes normally locked trip mechanisms on the main line and siding or side track released by a train passing thereover and operated, by an element on the train, to actuate a switch throwing mechanism whereby to shift the switch to proper position, said trip mechanisms being again operable to return the switch to its normal position, when desired, after the train has passed over the same.

An object of the invention is to provide an improved mechanism wherein the trip arm thereof is normally retained in a locked position, from which it is released by a depressible train actuated member and then operated to cause the actuation of the switch throwing mechanism.

Another object is the provision of a switch throwing mechanism including a rotatable element of novel construction actuated by the trip arm of either trip mechanism to reciprocate a switch bar to which the frogs of the switch are connected.

A further object is to provide an improved device for operating a signal by means of the switch arm whereby to indicate the position of the switch to an approaching train.

The inventive idea involved is capable of receiving a variety of mechanical expressions, one of which for the purpose of illustrating the invention, is shown in the accompanying drawing, wherein:—

Figure 1 is a side elevation of the switch operating mechanism constructed in accordance with the invention.

Fig. 2 is a top plan view thereof, the trip and switch throwing mechanism being shown in horizontal section.

Fig. 3 is a top plan view of one of the trip mechanisms.

Fig. 4 is a section on the line 4—4 of Fig. 2.

Fig. 5 is a section on the line 5—5 of Fig. 2.

Fig. 6 is a section on the line 6—6 of Fig. 2.

Fig. 7 is a section on the line 7—7 of Fig. 2.

Fig. 8 is a section on the line 8—8 of Fig. 2.

Fig. 9 is a detail view of the contact shoes carried by a train.

Referring more particularly to the drawings the numeral 10 indicates the tracks of the main line and 11 the tracks of a siding with which is associated a switch including the switch points 12.

The switch throwing mechanism which comprises one of the essential features of the invention is shown in what is now believed to be its preferred form and comprises a casing or housing 13 arranged adjacent the switch and having extending therefrom a switch bar 14 which extends transversely of the main line and is secured to the switch points 12 so that when said bar is actuated the switch will be shifted. The end of the bar mounted within the housing 13 is provided with a horizontally disposed roller 15. A vertical shaft 16 is fixed in the housing 13 and has mounted thereon a rotatable trip actuated element preferably in the form of a disk 17 having a hub portion 18 surrounding said shaft, the periphery of said disk being provided with a plurality of radially extending pins or projections 19 the purpose of which will later appear. The bottom of the disk 17 has secured thereto in any suitable manner an element 20 having a plurality of concave surfaces 21 forming the radial arms 22 the outer extremities of which are also concaved as indicated at 23. When the switch is closed to the siding, one of the concaved surfaces 21 engages the periphery of the roller 15 but when the disk 17 is rotated, carrying with it the element 20, said concave surface 21 which is in engagement with said roller will force the latter outwardly until the same is seated in one of the concaved ends 23. This outward movement of the roller 15 will exert a pull upon the switch bar 14 and shift the switch points 12 to the position shown in Fig. 2, against the tension of the coil spring 24 at which time the switch to the main line will be closed. It is to be noted that, by reason of the peculiar formation of the arms 22 of the element 20, there will be a slight movement of the switch bar 14 toward its original position before the roller 15 sits in the concaved end 23 and also that, by reason of the spring 24, there will be a slight yielding movement of the switch points 12 when a train is moving from right to left.

The upper end of the hub portion 18 which extends through the top of the housing 13 is surrounded and closed by a tubular housing 25 having an opening 26 normally closed by means of a door 27 which is locked in closing position in any preferred manner so that access, by an unauthorized person, cannot be had to the interior of said housing. However, if it is found necessary to manually operate the switch bar 14, the door 27 may be opened and a lever inserted into any one of the sockets 28 in the hub portion 18 so that the same may be rotated and thus actuate the switch.

A signal 29 is preferably associated with the switch bar 14 and adapted to be operated when the switch is thrown and for this purpose the standard 30 of said signal is provided at its lower end with a gear 31 engaged by a rack 32 carried by the end of the bar 14 opposite that which is mounted in the housing 13 so that when said bar 14 is reciprocated the standard 30 will be oscillated.

The main line and siding each has associated therewith a trip mechanism for actuating the switch throwing mechanism and since these trip mechanisms are identical in construction, a description of one will suffice for both. Each trip mechanism preferably comprises a trip arm 33 one end of which extends through an opening 34 in the adjacent side of the housing 13 and is engaged by one end of a leaf spring 35 to retain the same in proper position for contact with any one of the pins or projections 19 extending from the disk 17 so that when said trip arm is actuated, in a manner to presently appear, the end thereof extending into said housing will engage the adjacent pin 19 and rotate the disk 17 to shift the switch.

The trip mechanism further comprises a casing 36 into which extends the other end of the trip arm 33 which carries the contact plate 37. A small coil spring 38 has one end connected to the trip arm 33 and the other end to the casing 36 whereby to retain said trip arm in a normally retracted position. The trip arm is preferably locked in this position by means of a locking member 39 having a notch 40 intermediate its ends for engaging the contact plate 37 of said trip arm so as to prevent movement thereof toward the casing 13. This locking member 39 is carried by the free ends of a pair of strong leaf springs 41 having their other ends fixed in the bottom of the casing 36 and having vertical rods 42 extending therefrom, the upper ends of which are secured to a depressible element 43 preferably in the form of an elongated plate arranged outside of the adjacent track and adapted to be depressed by the wheels of a train passing thereover. The depression of this element 43 will release the trip arm so that the same may be actuated by the contact shoe 44, one of which is carried by each end of the train. When it is desired to shift the switch the shoe 44 is lowered so that the lower end thereof will extend into the slot 45 in the casing 36 on the outer side of the adjacent rail and engage the contact plate 37 of the trip arm 33 and force the same into engagement with any one of the pins 19. The trip arm is arranged at such an angle with respect to the direction of travel of the shoe 44 that, as the latter approaches the opposite side of the casing 36 during its passage therethrough and passes out through the other end of the slot 45, the same will become disengaged with the contact plate 37 and the spring will then return the trip arm to its normal position. The slots 45 are normally closed by the cover plates 46 to protect the interior of the casing 36 and said plates are yieldably retained in their normal positions by the springs 47. As the shoe 44 enters the slot 45 the same engages the adjacent end of the plate 46 and forces the same outwardly thus permitting the passage of the shoe 44 through the casing.

When a train is traveling from left to right and the trip mechanism at the left in Fig. 2 is operated to throw the switch to cause the train to enter the siding and if it is afterward desired to return the switch to its original position, as shown in said figure, a contact shoe 48 similar in construction to the shoe 44 and carried by the rear end of the train is adjusted to enter the inner slot 45 formed in the casing of the trip mechanism shown at the right in Fig. 2. This shoe 48 will then contact one end of a lever 49, the other end of which is in engagement with the contact plate 37 thus operating the trip arm 33 to which said plate is connected whereby to permit of the return of the train to the main line if desired. Should a train be traveling from right to left on the main line and it is desired to back the same upon the siding, the shoe 48 carried by the rear of the train is adjusted, if it is found necessary to close the switch to the siding, so that the same will pass through the inner slot 45 in the casing 36 of the trip mechanism shown at the left in Fig. 2. The contact shoe will then operate the lever 49 in said casing and operate the trip arm 33 in the same manner as just described in connection with the trip mechanism of the siding whereupon the switch will be thrown to proper position to permit the train to enter said siding.

What is claimed is:—

1. In a switch operating mechanism, the combination with a main line, a siding, and a switch therefor; of a switch throwing mechanism associated with said switch, a trip mechanism associated with the main line and siding, each trip mechanism including a casing, a trip arm slidable therein and actuated to operate the switch throwing mechanism, means for operating said trip arm when a train is passing in either direction over the trip mechanism, and a locking device in said casing for normally retaining the trip arm in an inoperative position.

2. In a switch operating mechanism, the combination with a main line, a siding, and a switch therefor; of a switch throwing mechanism associated with said switch, a trip mechanism associated with the main line and siding, each trip mechanism including a casing, a trip arm slidable therein and actuated to operate the switch throwing mechanism, means for operating said trip arm when a train is passing in either direction over the trip mechanism, a locking device in said casing for normally retaining the trip arm in an inoperative position, and a depressible member actuated by the train to release said locking device.

3. In a switch operating mechanism, the combination with a main line, a siding, and a switch therefor; of a switch throwing mechanism associated with said switch, a trip mechanism associated with the main line and siding, each trip mechanism including a casing, a trip arm slidable therein and actuated to operate the switch throwing mechanism, means for operating said trip arm when a train is passing in either direction over the trip mechanism, a locking device in said casing for normally retaining the trip arm in an inoperative position, a depressible member actuated by the train to release said locking device, and means for returning said trip arm to normal position after the same has been operated.

4. In a switch operating mechanism, the combination with a main line, a siding, and a switch therefor; of a switch throwing mechanism including a casing, a switch bar extending therefrom and connected to said switch, a rotatable element carried by the end of the switch bar in said casing, a second rotatable element mounted in said casing, and a contact member carried by the second named rotatable element and engageable with the first named rotatable element to actuate said switch bar, said contact member including a plurality of cam arms, and a trip mechanism for automatically actuating said second named rotatable element.

In testimony whereof, I affix my signature in the presence of two witnesses.

HAROLD E. MOUSE.

Witnesses:
A. E. DANN,
SHEFFEY TAYLOR.